(12) United States Patent
Hasegawa

(10) Patent No.: US 10,980,211 B2
(45) Date of Patent: Apr. 20, 2021

(54) LITTER FOR ANIMALS

(71) Applicant: UNICHARM CORPORATION, Ehime (JP)

(72) Inventor: Satoshi Hasegawa, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 560 days.

(21) Appl. No.: 15/539,758

(22) PCT Filed: Nov. 25, 2015

(86) PCT No.: PCT/JP2015/083114
§ 371 (c)(1),
(2) Date: Jun. 26, 2017

(87) PCT Pub. No.: WO2016/104028
PCT Pub. Date: Jun. 30, 2016

(65) Prior Publication Data
US 2017/0347620 A1    Dec. 7, 2017

(30) Foreign Application Priority Data

Dec. 26, 2014 (JP) .................................. 2014-266740

(51) Int. Cl.
*A01K 1/015* (2006.01)

(52) U.S. Cl.
CPC ............ *A01K 1/0154* (2013.01); *A01K 1/015* (2013.01); *A01K 1/0155* (2013.01)

(58) Field of Classification Search
None
See application file for complete search history.

(56) References Cited

U.S. PATENT DOCUMENTS

| 4,824,810 A * | 4/1989 | Lang | A01K 1/0154 119/173 |
|---|---|---|---|
| 2004/0255869 A1* | 12/2004 | Matsuo | A01K 1/0107 119/170 |
| 2005/0005869 A1* | 1/2005 | Fritter | A01K 1/0152 119/173 |
| 2007/0289543 A1* | 12/2007 | Petska | A01K 1/0154 119/173 |
| 2015/0075439 A1* | 3/2015 | Sogou | A01K 1/0107 119/166 |
| 2015/0181833 A1 | 7/2015 | Hiroshima et al. | |

(Continued)

FOREIGN PATENT DOCUMENTS

| CA | 2145636 A1 | 2/1995 |
|---|---|---|
| EP | 3150064 A1 | 4/2017 |
| JP | 8-502421 A | 3/1996 |

(Continued)

*Primary Examiner* — Ronak C Patel
(74) *Attorney, Agent, or Firm* — Hauptman Ham, LLP

(57) ABSTRACT

A litter for animals includes a plurality of granular materials including a high-bulk density granular material and a low-bulk density granular material at a ratio by mass of 60:40-40:60. The high-bulk density granular material contains bentonite as a main component, and the low-bulk density granular material is configured of a core layer and a skin layer, the skin layer coating the surface of the core layer and containing a binder by which grains of the plurality of granular materials are bound to each other.

8 Claims, 2 Drawing Sheets

(56) References Cited

U.S. PATENT DOCUMENTS

2016/0044891 A1\* 2/2016 Kuras .................. A01K 1/0154
                                                                    514/770

FOREIGN PATENT DOCUMENTS

| JP | 2010-247013 A | 11/2010 |
| JP | 2013-252082 A | 12/2013 |
| WO | WO 2013146551 | \* 10/2013 |
| WO | 2015/182164 A1 | 12/2015 |

\* cited by examiner (a)  (b)

LITTER FOR ANIMALS

RELATED APPLICATIONS

The present application is a national phase of International Application Number PCT/JP2015/083114 filed Nov. 25, 2015, which is based on, and claims priority from, Japanese Application Number 2014-266740, filed Dec. 26, 2014.

TECHNICAL FIELD

The present invention relates to litter to be used as a spreading material in an animal toilet for a cat, dog or the like.

BACKGROUND ART

In the prior art, toilets for animals such as dogs and cats have been known which have a toilet spreading material (litter) composed of granules with a water absorbing property, housed in a resin-formed toilet container. When litter used in such animal toilets absorbs liquid excreta such as urine that has been excreted by an animal, it generally forms a clump of multiple granules as the granules adhere to each other due to swelling and increased viscosity. The granule clump formed in this manner is removed from the toilet container by the owner.

Litter wherein the granule clump formed after absorption of urine is shallow in the depthwise direction of the toilet container, is also being studied. Examples of such litter include the animal litter proposed in PTL 1, which includes large-sized granules and small-sized granules composed mainly of a bentonite starting material, in a prescribed mixing ratio.

When the litter is formed by granules composed mainly of bentonite, as the animal litter disclosed in PTL 1, an advantage is provided in that the clump that is formed by absorption of urine tends to have higher strength and shallower depth.

CITATION LIST

Patent Literature

[PTL 1] Japanese Unexamined Patent Publication No. 2013-252082

SUMMARY OF INVENTION

Technical Problem

However, since granules composed mainly of bentonite have high bulk density, the animal litter products comprising such granules packed in bags are extremely heavy and difficult to handle during transport, while also often being difficult to carry by consumers.

It is therefore an object of the present invention to provide animal litter that has reduced bulk density while retaining the advantages of granules composed mainly of bentonite, i.e. the ability to form high-strength and shallow granule clumps after absorption of urine.

Solution to Problem

The animal litter of the present invention comprises granules that include high bulk density granules and low bulk density granules in a mass ratio of 60:40 to 40:60, the high bulk density granules being granules composed mainly of bentonite and the low bulk density granules being granules composed of a core layer and a skin layer including a binder that binds the numerous granules together, covering the surface of the core layer.

Since the animal litter of the present invention includes high bulk density granules composed mainly of bentonite and low bulk density granules having a specific structure and a lower bulk density than the high bulk density granules, in a specific mass ratio of 60:40 to 40:60, it is possible to form shallow granule clumps with high strength after absorption of urine, that also have drastically reduced litter bulk density, compared to conventional animal litter consisting entirely of high bulk density granules composed mainly of bentonite.

As used herein, "high bulk density" and "low bulk density" refer to the relative relationship of the bulk densities, and for example, low bulk density granules are granules with lower bulk density than high bulk density granules. Also as used herein, "clump" refers to a state with two or more granules adhering together.

Advantageous Effects of Invention

According to the present invention it is possible to provide animal litter that has reduced bulk density while retaining the advantage of being able to form a high-strength and shallow granule clump after absorption of urine.

DESCRIPTION OF EMBODIMENTS

Preferred embodiments of the animal litter of the present invention will now be described in detail with reference to the accompanying drawings.

Figure 1:
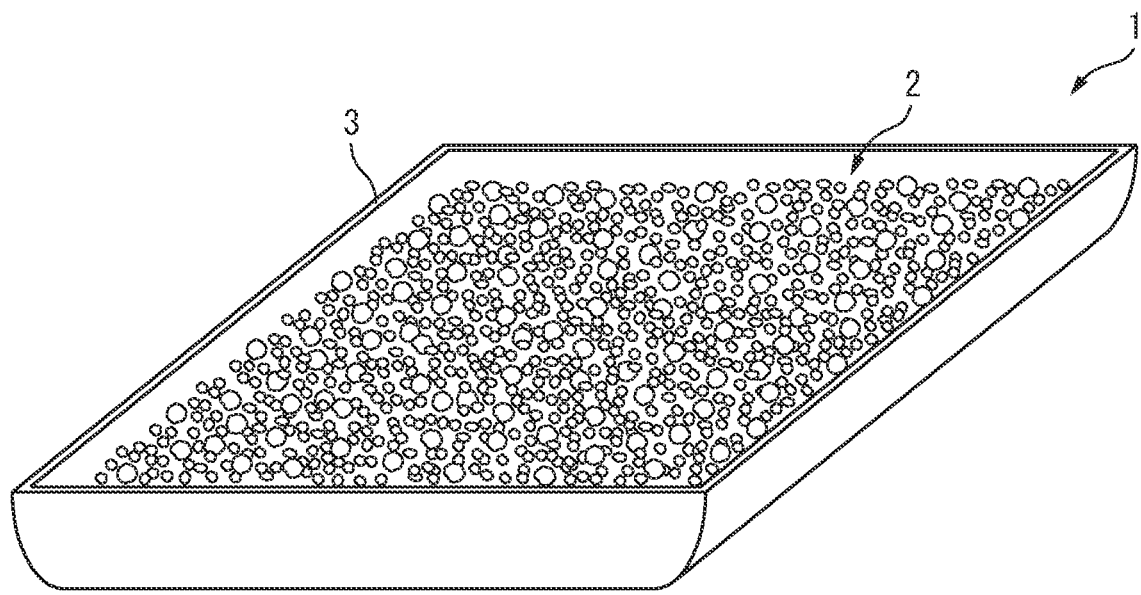
FIG. 1 is a perspective view of an animal toilet employing litter according to an embodiment of the present invention.
Figure 2:
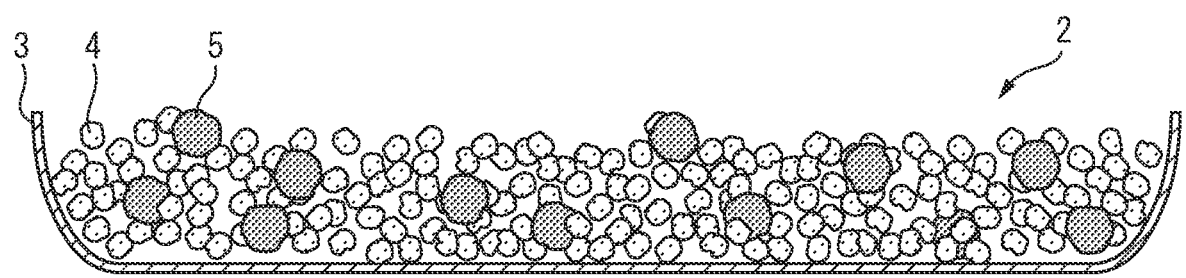
FIG. 2 is a cross-sectional view of an animal toilet employing litter according to an embodiment of the present invention.

FIG. 1 is a perspective view showing an overview of the construction of an animal toilet 1 employing litter 2 according to an embodiment of the present invention, and FIG. 2 is a cross-sectional view of the same. As shown in FIG. 1 and FIG. 2, the litter 2 according to the embodiment of the present invention is to be used as an absorber in an animal toilet 1, by being spread in a tray-like toilet container 3.

Figure 3:
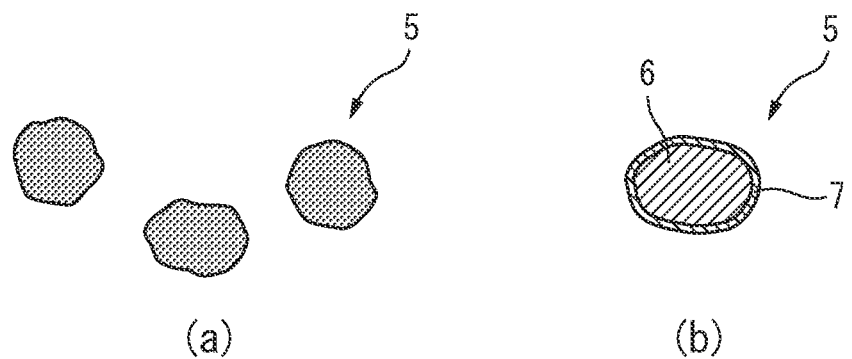
FIG. 3($a$) is a perspective view of low bulk density granules of litter according to an embodiment of the present invention, and FIG. 3($b$) is a cross-sectional view of the same.

As shown in FIG. 2, the litter 2 of this embodiment comprises granules that include high bulk density granules 4 composed mainly of bentonite and low bulk density granules 5 with lower bulk density than the high bulk density granules 4, the granules including the high bulk density granules 4 and the low bulk density granules 5 in a mass ratio of 60:40 to 40:60. Also, as shown in the perspective view (FIG. 3($a$)) and cross-sectional view (FIG. 3($b$)) of FIG. 3, the low bulk density granules 5 are composed of a core layer 6 and a skin layer 7 covering the surface of the core layer 6 and including a binder that can bind the granules together.

Figure 4:
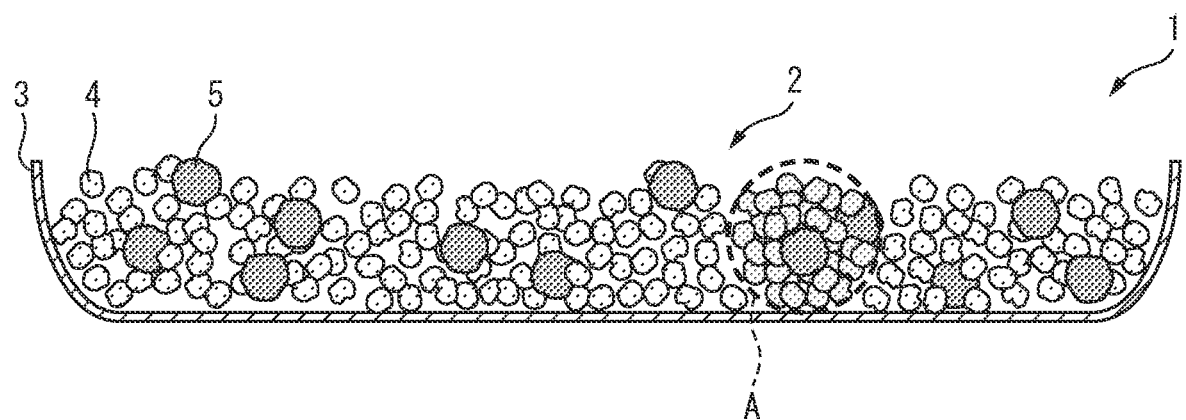
FIG. 4 is a cross-sectional diagram schematically showing the state of an animal toilet employing litter according to an embodiment of the present invention, after an animal has excreted urine.

The litter 2 of this embodiment, wherein the granules include low bulk density granules 5, has reduced bulk density for the litter 2 as a whole, and when an animal such as a cat has urinated, the bentonite as the main component of the high bulk density granules 4 and the binder included in the skin layer 7 of the low bulk density granules 5 both undergo swelling and increase in viscosity, thereby allowing formation of a granule clump as the granules adhere to each other. FIG. 4 is a cross-sectional diagram schematically showing the state of an animal toilet 1 employing litter 2 according to this embodiment, after an animal has urinated. As shown in FIG. 4, the clump A formed after absorption of urine is formed by mutual adhesion between the high bulk density granules 4 composed mainly of bentonite, between the low bulk density granules 5, and between the high bulk density granules 4 and low bulk density granules 5. If the depth of the clump formed after absorption of urine is deep (for example, deeper than 35 mm), the shape of the clump will be long cylindrical, making it difficult for the owner to scoop out the clump with a scoop or the like. Also, if the strength of the clump is low (for example, less than 6.4 N), the clump will tend to crumble and be less manageable when the owner has scooped the clump out with a scoop or the like.

According to the present invention, the litter includes the high bulk density granules and the low bulk density granules in a specific mass ratio of 60:40 to 40:60, thereby allowing the clump formed after absorption of urine to be formed with high strength and a shallow depth. Conventionally, high bulk density granules composed mainly of bentonite are able to exhibit viscosity as a whole when the granules absorb urine, so that the clump formed after absorption of the urine has high strength and shallow depth; however, since low bulk density granules exhibit viscosity while absorbing urine by the skin layer, the water absorption and viscosity of the granules is more limited than such high bulk density granules, and the clump formed after absorption of urine tends to have low strength and an increased depth. However, if it includes the high bulk density granules and low bulk density granules in a specific mass ratio of 60:40 to 40:60, the strength of the clump formed after absorption of urine can be kept to a prescribed minimum strength or greater (for example, 6.4 N or greater) while lowering the bulk density of the litter as a whole, and a shallow clump (with a depth of no greater than 35 mm, for example) can be formed. If the mixing ratio of the low bulk density granules is higher than the aforementioned range for the mass ratio, then it will not be possible to increase the strength of the clump formed after absorption of urine, and the depth of the clump will also tend to be deep. Conversely, if the mixing ratio of the low bulk density granules is lower than the aforementioned range for the mass ratio, then it will not be possible to adequately lower the bulk density of the litter and the clump will also be less likely to be shallow.

According to the present invention, the high bulk density granules are not particularly restricted and granules of any desired form may be used, so long as they are granules composed mainly of bentonite. Examples of such granules include granules obtained by pulverizing bentonite ore with a Raymond mill or the like and then chamfering it, and granules obtained by mixing finely ground bentonite ore as the main component with another material, and granulating the mixture. As used herein, "composed mainly of" means that the component constitutes a proportion exceeding 50 mass % of the total constituent components.

Examples of such other materials include inorganic materials such as zeolite and silica gel; various additives such as aromatic substances, antimicrobial agents and coloring agents; and solidifying accelerators such as sodium carbonate. The content of such other materials is preferably no greater than 30 mass % and more preferably no greater than 20 mass %, from the viewpoint of suitably maintaining the viscosity of the granules after absorption of urine.

According to the present invention, the low bulk density granules are composed of a core layer and a skin layer that covers the surface of the core layer and includes a binder that can bind the granules together. The material forming the core layer is not particularly restricted so long as it is a material with lower bulk density than the high bulk density material such as bentonite, and examples include organic materials, among which there may be used pulp, paper, wood waste, wood dust, okara, used tea leaves, various hygienic scrap materials and super-absorbent polymers (SAP) such as polyacrylic acid salts. Such organic materials may be used alone, or two or more may be used in combination. The material forming the core layer may also contain a sizing agent such as starch, in addition to the organic material.

The material forming the skin layer is not particularly restricted so long as it exhibits cohesiveness upon absorbing moisture and includes a binder that can bind the granules together, but it preferably includes at least one type of binder selected from the group consisting of starch, super-absorbent polymers and bentonite. When starch or a super-absorbent polymer is used as the binder, clumps formed after absorption of urine can be formed with high strength and shallow depth while maintaining the low bulk density of the low bulk density granules, and when bentonite is used as the binder, the bulk density of the low bulk density granules is increased slightly but clumps formed after absorption of urine can be formed more firmly and with shallower depth. Of these, starch is particularly preferred from the viewpoint of allowing clumps with shallower depth to be formed after absorption of urine, and a super-absorbent polymer is preferred from the viewpoint of a greater effect of reduced bulk density (lighter weight) of the litter.

Such low bulk density granules can be produced in the following manner. First, the material that is to form the core layer is granulated by desired pressure molding, such as extrusion molding or compression molding, to obtain a granular core layer. The obtained granular core layer is then mixed with the material that is to form the skin layer, using a desired mixer, or the surface of the obtained granular core layer is coated with the material that is to form the skin layer, by desired coating means such as spray coating, to obtain low bulk density granules having the skin layer covering the surface of the granular core layer. The granular core layer used may be one obtained by granulation as described above, or a commercially available one.

According to the present invention, the bulk density of the high bulk density granules and low bulk density granules is not particularly restricted so long as it satisfies a relationship such that the bulk density of the low bulk density granules is lower than the bulk density of the high bulk density granules, but preferably the bulk density of the high bulk density granules is in the range of 500 to 1500 g/L and the bulk density of the low bulk density granules is in the range of 100 to 800 g/L. If the bulk density of the high bulk density granules and the low bulk density granules is within this range, then when the granules are mixed and packed into a bag as a product, it will be possible to drastically reduce the weight of the litter product compared to a conventional product consisting entirely of high bulk density granules, and to thus facilitate handling by women and children, for example.

As used herein, "bulk density" refers to the value obtained by dividing the total mass of the granules, when the granules have been filled to the brim in a container having a fixed volume (for example, 1 L), by said volume, and converting the obtained value to units of g/cm$^3$.

According to the present invention, the particle sizes of the high bulk density granules and low bulk density granules are not particularly restricted, but preferably the particle size of the high bulk density granules is in the range of 0.5 to 2.0 mm and the particle size of the low bulk density granules is in the range of 0.8 to 8.0 mm. If the particle size of the high bulk density granules is 2.0 mm or smaller, the number of granules per unit volume will be greater and the surface area will be increased with respect to the weight of the granules, thereby allowing the cohesiveness produced by urine absorption and swelling to be efficiently exhibited. If the particle size of the high bulk density granules is at least 0.5 mm, the handling will not be so difficult to manage as with powder, and secondary aggregation of the granules will be less likely to occur, allowing their cohesiveness to be more efficiently exhibited.

Moreover, if the particle size of the low bulk density granules is at least 0.8 mm, the number of granules per unit volume will be lower and the surface area with respect to the weight of the granules will be small, thereby allowing the amount of high-specific-gravity binder to be reduced, and allowing the weight per litter product to be decreased. If the particle size of the low bulk density granules is no greater than 8.0 mm, then it will be possible to ensure at least a fixed contact area between the low bulk density granules or between the low bulk density granules and the high bulk density granules, and to firmly form the clumps that form after absorption of urine.

If the particle sizes of the high bulk density granules and the low bulk density granules are thus within the respective ranges specified above, it will be possible to more firmly form the clumps that form after absorption of urine, while lowering the bulk density of the litter.

As used herein, the "particle size" of the granules is the size of the granules as determined by a sieve screening method, i.e. based on the sieve mesh opening, and specifically, it is the particle size (maximum peak particle size) (mm) corresponding to the maximum peak of the mass particle size distribution obtained by a sieve screening method. The particle size distribution can be obtained using a vibrating sifter (for example, a Model AS-200 by Retsch Corp.) comprising multiple sieves with different mesh openings, sifting a prescribed mass of the granules (for example, 150 g) for a prescribed time period (for example, 3 minutes), and calculating the mass percentage (%) from the mass (g) of granules remaining on each sieve. The multiple sieves with different mesh openings may be sieves with mesh openings of 0.177 mm, 0.425 mm, 1.0 mm, 1.4 mm, 1.7 mm, 2.0 mm, 2.8 mm, 4.0 mm and 8.0 mm, for example.

The high bulk density granules and low bulk density granules are aggregates of granules, each having a prescribed mass particle size distribution, and according to the present invention the maximum peak particle size in the mass particle size distribution of the high bulk density granules is preferably smaller than the maximum peak particle size in the mass particle size distribution of the low bulk density granules (hereunder referred to as "aspect a").

If the maximum peak particle size in the mass particle size distribution of the high bulk density granules is smaller than the maximum peak particle size in the mass particle size distribution of the low bulk density granules, i.e. if the particle size of the high bulk density granules is smaller than the particle size of the low bulk density granules, then the high bulk density granules of small particle size will more readily infiltrate in the gaps between the low bulk density granules of large particle size, resulting in more dense compacting of the granules, and thereby allowing clumps formed after absorption of urine to be formed in a firmer and more shallow manner.

Also according to the present invention, in addition to aspect a, preferably the maximum peak particle size of the high bulk density granules and the maximum peak particle size of the low bulk density granules are each within the range of 1 to 2 mm (hereunder referred to as "aspect b"). By reducing the difference in particle size between the high bulk density granules and the low bulk density granules, the high bulk density granules and low bulk density granules will fail to completely separate even when the litter is stirred up by kicking behavior of a cat or by the act of removing clumps by the owner during use of the litter, thus helping to maintain the mixed state of the high bulk density granules of small particle size that have infiltrated in the gaps between the low bulk density granules of large particle size, and allowing the effect of aspect a to be exhibited more reliably over a longer period of time.

In addition to aspect a, or in addition to aspect a and aspect b, according to the present invention, preferably the mass ratio of particles of less than 1 mm with respect to the total particles of the high bulk density granules is larger than the mass ratio of particles of less than 1 mm with respect to the total particles of the low bulk density granules (hereunder referred to as "aspect c"). If the high bulk density granules contain more fine granules with a particle size of less than 1 mm than the low bulk density granules, then the fine granules of the high bulk density granules will more easily migrate to the region below the low bulk density granules of high particle size, thereby allowing the fine granules of the high bulk density granules to infiltrate into the gaps under the low bulk density granules formed on the base of the toilet container when the litter has been spread in the toilet container, and reducing the gaps. Thus, even when excreted urine has permeated the litter, it will be absorbed by the fine granules present at the base of the toilet container, making it difficult for the urine to reach the base of the toilet container. As a result, it is possible to reduce bad odor and bacterial growth caused by urine pooling at the base of the toilet container, and to keep the animal toilet in a satisfactory hygienic condition. In addition, if the mass ratio of particles of less than 1 mm with respect to the total particles of the high bulk density granules is 30% or greater and the mass ratio of particles of less than 1 mm with respect to the total particles of the low bulk density granules is less than 30%, then the effect of aspect a to aspect c can be exhibited more effectively.

The term "total particles", as used herein, means all of the particles of the respective granules, and not all of the particles of the mixture obtained by mixing the respective granules. Therefore, the total particles of the high bulk density granules, for example, means all of the particles that are high bulk density granules, and not all of the particles of the mixture comprising the high bulk density granules and low bulk density granules. The mass ratio of the particles of less than 1 mm with respect to the total particles of each type of granules can be determined from the aforementioned mass particle size distribution.

The litter of the present invention can be suitably used in an animal toilet such as that of the aforementioned embodiment (i.e. in the form shown in FIG. 1); however, instead of an animal toilet of this form it may also be applied as a spreading material in a rearing cage or a livestock stable, for example. Furthermore, the litter of the present invention is not restricted to the embodiment described above or the following examples, and it can incorporate appropriate combinations and modifications within a range that is not outside of the object and gist of the present invention.

EXAMPLES

The present invention will now be explained in greater detail using examples and comparative examples, with the understanding that the present invention is not limited only to these examples.

[Preparation of Granules]

The high bulk density granules used were of a pulverized bentonite ore.

The low bulk density granules were two types of low bulk density granules, produced in the following manner.

First, starch was granulated by extrusion foam molding to form a granular core layer made of foamed starch. A mixer was used to mix the obtained granular core layer with a covering material including a binder which was a mixture of 20 mass % starch and 80 mass % bentonite, in a mass ratio of core layer:covering material=60:40, to obtain low bulk density granules I comprising a granular core layer with the surface covered by a covering material as the skin layer.

Low bulk density granules II were obtained in the same manner as the low bulk density granules I, except that the material composing the core layer was 100 mass % pulp and the binder in the skin layer was a mixture of 50 mass % pulp, 20 mass % super-absorbent polymer and 30 mass % starch.

The mass particle size distribution of each of the granules, the high bulk density granules, low bulk density granules I and low bulk density granules II prepared as described above, was measured by the sieve screening method described above. The results for the measured mass particle size distributions are shown in Table 1 below.

ratios) listed in Table 2 below, to a total volume of 1 L, after which the polyethylene bag was repeatedly inverted 10 times to mix the granules in the polyethylene bag, obtaining litter for Examples 1 to 6 and Comparative Examples 2 to 5. The litter used for Comparative Example 1 was the aforementioned high bulk density granules alone, as the litter of Comparative Example 1. Each litter obtained in Examples 1 to 6 and Comparative Examples 1 to 5 was measured for bulk density and clump depth and strength, by the methods described below. The measurement results are shown below in Table 2.

<Bulk Density Measurement>

The litter was filled and leveled off in a 1 L-volume container, and the mass was measured. The previously measured mass of the container was subtracted from the measured mass to calculate the mass of the litter. The calculated value was divided by the volume of the container and converted to $g/cm^3$ units to determine the bulk density $(g/cm^3)$.

<Clump Depth Measurement>

The litter was placed in a beaker to a depth of 10 cm or greater. Artificial urine, which was 20 ml physiological saline (0.9% NaClaq) at 22° C., was dropped into the beaker containing the litter from a height of 3 cm from the top surface of the litter over a period of 10 seconds. After dropping the artificial urine, it was allowed to stand for 10 minutes and the depth (mm) of the resulting clump was measured.

<Clump Strength Measurement>

The clump whose depth was measured according to <Clump depth measurement> was placed on the horizontal surface of a measuring stage. A digital force gauge (FGP-5, product of Nidec-Shinpo Corp., tip pin shape: circular, tip pin diameter: 10 mm) was used as an indentation force meter, the tip pin of the digital force gauge was pressed against the clump in the vertical direction from above the clump set on the horizontal surface, at a speed of 50 cm/min,

TABLE 1

|  | <0.177 mm | 0.177-0.425 mm | 0.425-1.0 mm | 1.0-1.4 mm | 1.4-1.7 mm | 1.7-2.0 mm | 2.0-2.8 mm | 2.8-4.0 mm | 4.0-8.0 mm | >8.0 mm |
|---|---|---|---|---|---|---|---|---|---|---|
| High bulk density granules (%) | 0.1 | 1.3 | 36.8 | 31.3 | 13 | 11.3 | 5.9 | 0.3 | 0 | 0 |
| Low bulk density granules I (%) | 0.4 | 0.3 | 21 | 33.2 | 18.3 | 22.4 | 4.4 | 0 | 0 | 0 |
| Low bulk density granules II (%) | 0 | 0 | 0 | 0 | 0 | 0 | 0.1 | 64.7 | 35.2 | 0 |

The high bulk density granules, low bulk density granules I and low bulk density granules II were loaded into a 10 L-volume polyethylene bag in the mixing ratios (mass and the maximum load when the tip pin reached the horizontal surface was measured and recorded as the clump strength (N).

TABLE 2

|  |  | Example 1 | Example 2 | Example 3 | Example 4 | Example 5 | Example 6 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| Compositional ratio | High bulk density granules | 60 | 50 | 40 | 60 | 50 | 40 | 100 | 70 | 20 | 70 | 20 |
|  | Low bulk density granules I | 40 | 50 | 60 |  |  |  |  | 30 | 80 |  |  |
|  | Low bulk density granules II |  |  |  | 40 | 50 | 60 |  |  |  | 30 | 80 |
| Bulk density (g/cm³) |  | 740 | 591 | 553 | 549 | 475 | 416 | 1004 | 881 | 502 | 643 | 333 |
| Clump depth (mm) |  | 27.7 | 26.8 | 25.9 | 32.5 | 36.0 | 44.0 | 22.2 | 28.5 | 40.5 | 41.0 | 55.0 |
| Clump strength (N) |  | 5.5 | 5.0 | 5.7 | 6.3 | 5.5 | 5.6 | 8.1 | 6.5 | 4.0 | 5.1 | 3.6 |

As shown in Table 2, the litters of Examples 1 to 6 all had low litter bulk density, as well as shallow depth and high strength of clumps after absorption of artificial urine.

The litter of Comparative Example 1, on the other hand, which contained no low bulk density granules, had satisfactory clump depth and strength after absorption of artificial urine; however, the bulk density was high. Also, the litters of Comparative Examples 2 and 4, which had excessively low mixing ratios of low bulk density granules, did not exhibit an adequate effect of lowered bulk density (reduced weight) of the litter, and shallow clumps could not be formed after absorption of artificial urine. The litters of Comparative Examples 3 and 5, which had excessively high mixing ratios of low bulk density granules, could not form shallow clumps after absorption of artificial urine, and the strength was also low.

REFERENCE SIGN LIST

1 Animal toilet
2 Animal litter
3 Toilet container
4 High bulk density granules
5 Low bulk density granules
6 Core layer
7 Skin layer
A Clump

The invention claimed is:

1. Animal litter, comprising:
numerous granules,
wherein
the numerous granules contain high bulk density granules and low bulk density granules in a mass ratio of 60:40 to 40:60,
the high bulk density granules being granules composed mainly of bentonite,
the low bulk density granules being granules composed of a core layer and a skin layer comprising a binder that binds the numerous granules together, covering a surface of the core layer,
a material of the core layer of the low bulk density granules has a lower bulk density than the bentonite of the high bulk density granules,
the high bulk density granules and the low bulk density granules are aggregates of granules, each having a prescribed mass particle size distribution, and
a maximum peak particle size in the mass particle size distribution of the high bulk density granules is smaller than the maximum peak particle size in the mass particle size distribution of the low bulk density granules, wherein a bulk density of the high bulk density granules is 500 to 1500 g/L and the bulk density of the low bulk density granules is 100 to 800 g/L.

2. The animal litter according to claim 1, wherein the maximum peak particle size of the high bulk density granules and the maximum peak particle size of the low bulk density granules are each in the range of 1 to 2 mm.

3. The animal litter according to claim 2, wherein a mass ratio of particles of less than 1 mm with respect to total particles of the high bulk density granules is larger than the mass ratio of particles of less than 1 mm with respect to total particles of the low bulk density granules.

4. The animal litter according to claim 1, wherein
a mass ratio of particles of less than 1 mm with respect to total particles of the high bulk density granules is 30% or greater, and
the mass ratio of particles of less than 1 mm with respect to total particles of the low bulk density granules is less than 30%.

5. The animal litter according to claim 1, wherein a particle size of the high bulk density granules is 0.5 to 2.0 mm and a particle size of the low bulk density granules is 0.8 to 8.0 mm.

6. The animal litter according to claim 1, wherein the binder is at least one type selected from a group consisting of starch, super-absorbent polymers and bentonite.

7. The animal litter according to claim 1, wherein the binder is starch.

8. The animal litter according to claim 1, wherein the binder is a super-absorbent polymer.

* * * * *